(12) United States Patent
Maxim et al.

(10) Patent No.: US 8,008,640 B2
(45) Date of Patent: Aug. 30, 2011

(54) MAXIM ELECTRON SCATTER CHAMBER

(75) Inventors: Joseph E. Maxim, Bryan, TX (US);
Jack A. Neal, Sugar Land, TX (US);
Alejandro Castillo, College Station, TX (US)

(73) Assignee: The Texas A&M University System, College Station, TX (US)

( * ) Notice: Subject to any disclaimer, the term of this patent is extended or adjusted under 35 U.S.C. 154(b) by 266 days.

(21) Appl. No.: 12/496,071

(22) Filed: Jul. 1, 2009

(65) Prior Publication Data
US 2010/0001206 A1 Jan. 7, 2010

Related U.S. Application Data

(60) Provisional application No. 61/077,229, filed on Jul. 1, 2008.

(51) Int. Cl.
*A23L 3/00* (2006.01)
*A23L 3/26* (2006.01)
(52) U.S. Cl. .......... 250/492.3; 250/455.11; 426/240
(58) Field of Classification Search ............ 250/492.3, 250/455.11; 426/240; 422/22
See application file for complete search history.

(56) References Cited

U.S. PATENT DOCUMENTS

| | | | |
|---|---|---|---|
| 4,652,793 A | 3/1987 | Nablo | |
| 4,983,849 A * | 1/1991 | Thompson et al. | ........ 250/492.3 |
| 5,825,037 A | 10/1998 | Nablo | |
| 5,989,498 A | 11/1999 | Odland | |
| 6,221,216 B1 | 8/2001 | Nablo et al. | |
| 7,145,155 B2 | 12/2006 | Nablo et al. | |

OTHER PUBLICATIONS

International Search Report and Written Opinion for PCT/US2009/049408 dated Feb. 11, 2010.
Weiss, D., et al., "Electron beam process validation for sterilization of complex geometries," Radiation Physics and Chemistry (2002), 63:581-586.

* cited by examiner

*Primary Examiner* — Jack Berman
*Assistant Examiner* — Eliza Osenbaugh-Stewart
(74) *Attorney, Agent, or Firm* — Chainey P. Singleton; Edwin S. Flores; Chalker Flores, LLP

(57) ABSTRACT

The present invention includes a system, methods and apparatus for sterilization of an object (e.g., food products). The present invention takes advantage of the electron scatter that occurs when electron beam is applied onto a surface. The present invention is capable of treating irregular surfaces (e.g., carcasses, spherical/round surfaces) or any type of surface where complete penetration is not needed or desired.

19 Claims, 3 Drawing Sheets

MAXIM ELECTRON SCATTER CHAMBER

CROSS-REFERENCE TO RELATED APPLICATIONS

This application claims priority to U.S. Provisional Application Ser. No. 61/077,229, filed Jul. 1, 2008, the entire contents of which are incorporated herein by reference.

TECHNICAL FIELD OF THE INVENTION

The present invention relates in general to the field of pasteurization or sterilization of objects and, more particularly, to methods and apparatus designed to pasteurize objects (e.g., food products) without significantly degrading characteristics of the object.

BACKGROUND OF THE INVENTION

Various methods of pasteurizing food products have been developed over the years. Most of the commercial processes are for pasteurizing liquid/semi-liquid food products, such as juices, pastes, relishes, sauces, and other foods, involve heating the product to a process temperature above certain temperature and holding it for a scheduled process time and then rapidly cooling the product prior to packaging. Unfortunately, methods involving high heat such as this can sometimes damage the food product and reduce its quality. For example, flavors may be reduced, desirable colors may be lost, and nutritional value may diminish. Thus, while conventional thermal processing has become the predominant commercial pasteurization method, the overall quality of the food products would be greatly increased if the drawbacks of high heat processing were reduced or eliminated.

A number of processes have been developed and proposed related to non-thermal methods of pasteurization. These processes typically use ultra filtration, ozonation, ultraviolet light, irradiation, high hydrostatic pressure (HHP) and pulsed electric field (PEF) discharge. Other non-thermal technologies useful for this purpose include high voltage arc discharge, oscillating magnetic field discharge and ultrasonic discharge.

For example, in U.S. Patent Application Publication Number 20030026877 discloses a method and apparatus for sterilizing a liquid that has pathogens living in the liquid. Typically, the liquid with living pathogens is placed in a reaction volume, and a non-thermal plasma is generated within the reaction volume to kill at least a portion of the pathogens within the liquid to achieve sterilization.

Another example can be found in U.S. Patent Application Publication Number 20040016892. Briefly, the '892 Application teaches an improved electronic pasteurization method and system. This improved electronic pasteurization system includes a coupled accelerator and a treatment station. The coupled accelerator includes a coupled multiplier supply (CMS) having a mechanical drive system and power modules. The mechanical drive system supplies mechanical power to the power modules, which convert the mechanical power into electrical power that provides stepped-up power to the accelerator column.

Another example can also be found in U.S. Patent Application Publication Number 20040191374 by Weng, et al. Briefly, Weng discloses a multi-stage system and method for pasteurizing food products that includes a first processing unit configured to receive the food product and apply an amount of non-thermal energy treatment to the food product which is effective to inactivate enzymes. A second processing unit configured to receive the food product from the first processing unit and to reduce the population of potentially harmful microorganisms to a level that is not harmful to consumers. The second processing unit may also include a concentration unit, which removes water from the food product to produce a concentrated form of the product. The first processing unit may have a high voltage-arc discharge unit, a non-thermal pulsed electric field unit, an oscillating magnetic field unit, or an ultrasonic unit.

Yet another example is shown in U.S. Pat. No. 7,373,254 issued to Pierce. Briefly, Pierce discloses a process of selectively exposing matter to a specific wavelength of electromagnetic energy in sufficient flux density per wavelength to cause or promote a desired effect. The process includes destroying, disinfecting, denaturing, disinfesting, disrupting, or dehydration of the substances present. The '254 patent also relates to subjecting matter, which may contain a mixture of substances, to electromagnetic energy, in concurrence with its spectral properties to exploit the spectral differences within the substance or within a mixture of substances. Energies are applied to cause wavelength-dependent reactions resulting from differential absorption; this additional applied energy manifests itself in changes, or quantum transitions, in the vibrational, rotational, magnetic, and electronic states of the molecules. Generally, the process uses wavelengths from one light second to ten electron volts, or wavelengths with energy levels less than that of ionization.

Finally, U.S. Pat. No. 7,187,752 entitled "Product irradiator for optimizing dose uniformity in products" issued to Kotler discloses an apparatus and method for irradiating a product or product stack with a relatively even radiation dose distribution. The apparatus includes a radiation source, an adjustable collimator, a turntable capable of receiving a product stack and a control system capable of adjusting the adjustable collimator to vary the geometry of the radiation beam as the product stack is rotated in the radiation beam. Kotler also discloses modulation of the radiation beam energy and power and that a low dose uniformity ratio in the product stack is achieved by varying the angular rotational velocity of the product stack in a radiation beam.

However, almost all of the above mention references suffer from multiple drawbacks. For example, most existing technologies cannot deliver uniform dose of energy. When the energy dose is too high, the object (e.g., food products) may be damaged, and if the dose is too low, insufficient sterilization can occur. Furthermore, shape of the object causes additional problems because irregular shapes (e.g., round or that of a carcass) contribute more towards non-uniform energy dose distributions by displaying hard to reach angles for a typically irradiation to reach.

SUMMARY OF THE INVENTION

The present invention provides methods and apparatus to apply electron beam irradiation on geometrically irregular surfaces. Electron scattering is normally perceived as a disadvantage of e-beam irradiation; however, the present invention demonstrated surprising and unexpected capability of generating energy doses that produce the greatest bacterial reduction without affecting product quality for round and/or irregular surfaces of one ore more object.

In one aspect, the present invention describes methods, systems and apparatus for pasteurization/sterilization to cause a reduction in bioburden by using one or more of the linear high energy electron beams. The system includes: a chamber having a scattering space inside; a mesh positioned in the scattering space; at least one linear electron accelerator directed into the scattering space to be scalable in power to generate one or more linear electron beams (e.g., 10 MeV electron beam). The one or more 10 MeV electron beams, maintained to operate between the mandated energy (ea) values of 9.8 to 10.2, strike the mesh and scatter in random linear directions to produce an almost infinite number of omni-directional electron beams and generate an energy cloud in the scattering space with sufficient energy levels to produce dose accumulation on the target surface to achieve pasteurization/sterilization.

Another embodiment of the present invention is a target sterilization system comprising: a chamber having a inner scattering space; a mesh positioned in the scattering space; at least one energy accelerator directed into the scattering space operable to be scalable in electrical power to generate one or more linear electron beams; wherein one or more of the linear electron beams strike the mesh and scatter in random linear directions to produce one or more omni-directional energy beams and an electron cloud in the scattering space with sufficient energy levels for dose accumulation on the target surface to achieve at least substantial sterilization.

In another aspect, the system of the present invention can have a mesh (e.g., a stainless steel mesh, a galvanized wire grid or a stainless steel scrubbing pad) disposed along interior surface of the chamber to provide an infinite number of angles for one or more of the linear electron beams to be scattered omni-directionally and, optionally, a target holder to secure at least one target within the chamber. The target of the present invention can include any types, sizes and shapes (e.g., round, spherical, cylindrical, or objects with uneven or irregular surfaces).

In another aspect, the present invention includes methods to pasteurize at least one target. The method includes placing at least one target in a chamber having a scattering space; generating an infinite number of linear electron beams using at least one linear high energy (10 MeV) electron accelerator; to contact a mesh (or any other scattering device) positioned in the scattering space; scattering one or more of the linear electron beam in random linear directions, thereby generating an electron cloud consisting of electrons of various energy levels; and allowing the energy cloud to engulf the target with sufficient number of impacts to accumulate dose and for sufficient amount of time to achieve the desired dose accumulation for pasteurization/sterilization. The method can also include an attenuating device for one or more of the linear electron beam using at least one energy attenuator, where the direct linear high energy electron beam is attenuated to a level where the final accumulated dose will be congruent with the desired/achieved dose levels throughout the target surface.

In another embodiment, the present invention includes a method to pasteurize/sterilize at least one target comprising: placing at least one target in a chamber having a scattering space; generating one or more linear energy beams using at least one electron accelerator; directing one or more of the linear electron beam to contact a mesh positioned in the scattering space; and scattering one or more of the linear electron beam in random linear directions to generate an energy cloud for sufficient time to engulf the target surface with sufficient dose accumulation as the function of exposure time to achieve at least substantial sterilization.

In some aspect, the scattering of one or more of the linear electron beam is continuous, and the electron cloud has sufficient energy to accumulate the desired dose on the surface and to penetrate enough to secure the bio-burden reduction targeted for the surface, up to about one centimeter of the target material, dependent on the density of the target mass.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
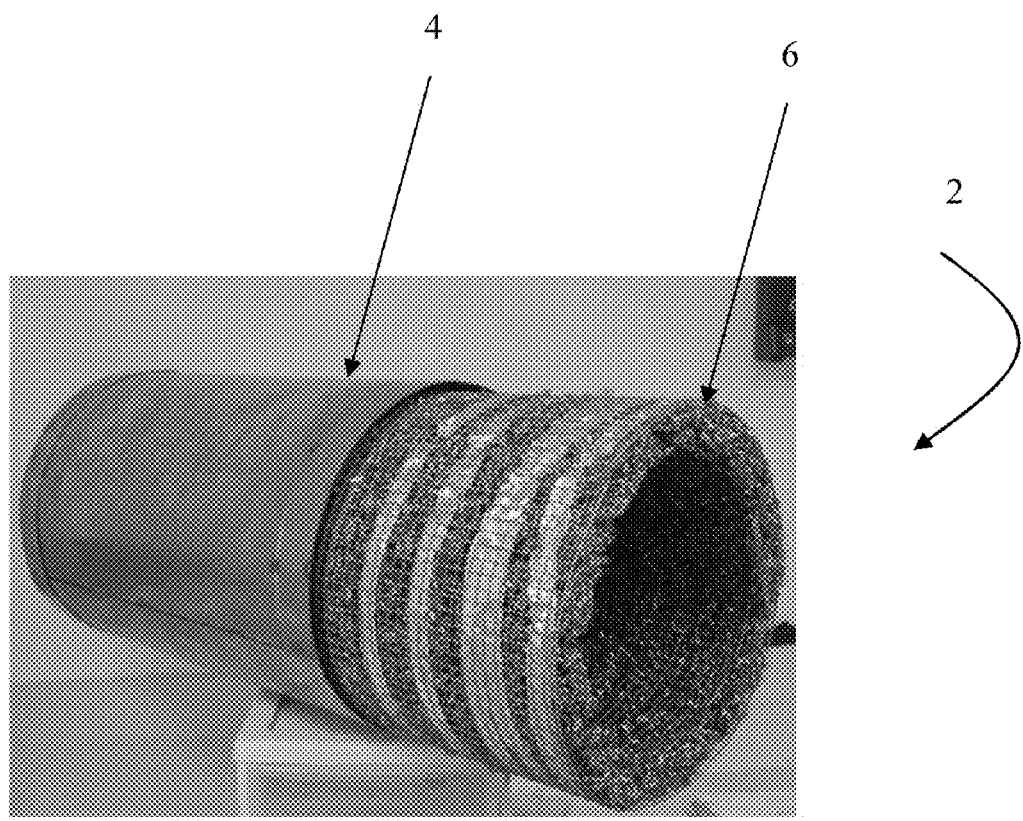
FIG. 1 is a actually photograph of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of certain embodiments, and are not intended to limit the materials/designs and ways to make and use the invention and they are not to limit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Electron beam irradiation exists in foods and has relatively low penetration power. When electron beam irradiation is applied onto a surface, most electrons collide with the target and penetrate to a predictable depth depending on the density of the target material. However, some electrons are scattered by the surrounding objects over the surface. These scatter electrons have much lower energy, and do not penetrate the target mass to any appreciable extent. Electron scattering is commonly perceived as a disadvantage of the electron beam irradiation process. However, the present invention demonstrated surprising and expected results that these electrons can reach different points of surfaces regardless of the geometry, because the path of the scattered electron is linear only between a scatter generating collision point and the impact point on the target surface. The present invention shows that in a cylindrical scatter chamber, electrons travel in a randomly linear fashion to any point of the surface placed in the center of the cylinder.

As used herein, the terms "sterilize" and "pasteurize" are used interchangeably to refer to the elimination of most, if not all, living microbes, e.g., bacteria, fungi, viruses and combinations thereof, from a target surface, e.g., a foodstuff or an item in need of sterilization or the elimination of microbes. As used herein, the term "power" refers to the amount of an electrical energy or potential that is provided to generate an electron beam, including an electron cloud, into which a target is placed for treatment, that is, elimination of microbes. The present invention takes advantage of the electron scatter that occurs when electron beam is applied onto any surface. In one embodiment, the present invention includes a chamber, where the main beam of electrons over the target mass is attenuated out, and randomly scattered electrons generated by a peripheral stainless steel mesh structure receiving the main beam of electrons accumulates a lethal dose on the surface of the target material. The scatter activity of the present invention can irradiate any type of surface, and therefore is an ideal alternative for treating irregular surfaces such as carcasses, spherical/round surfaces such as melons, medical transplant devices or any type of product surface where penetration is not needed or desired. The present invention provides reasonably uniform distribution of surface doses from scattered electrons on all different points of the target surfaces.

With scattered electrons, the present invention can treat any type of surface with accumulated doses distributed over the surface (e.g., efficacious electron beam irradiation of melons, mangoes, carcasses and any other type of surface). Unlike previously known systems, the present invention has greater consistencies and dose uniformities in doses delivered than doses delivered by direct (non-scattered) linear high energy electron beams on target objects with irregular geometry. The irradiation treatment applied in the present invention have the same characteristics and effects as regular electron beam irradiation, e.g., strong antimicrobial power and low penetration power, being designed for products where a surface treatment or a treatment with a penetration of less than about 1 centimeter.

In one embodiment, the present invention enables high-energy electrons to accumulate dose on irregular geometric surfaces to a planned dose level to achieve the target objective of pasteurization or sterilization of all surface points of any irregular geometric surface. Dose accumulation comes from both the uni-directional high-energy electron beams and the Omni-directional scattered electron beams produced by the scattering sub-system. The present invention has high-energy electrons (uni-directional, direct electron beam) exiting the scanning horn of two Linear Accelerators generating about 10 MeV (one directed towards one end of the scatter chamber, the other directed towards the diametrically opposite end of the scatter chamber) enter the cylindrical chamber through one of two ways described herein.

First, through the attenuating mass placed in the path of the direct uni-directional electron beams to prevent the dose accumulation from the unidirectional beams to be greater than the dose accumulation from the omni-directional scattered electrons. The diameter of the attenuating mass is less than the airspace of the scatter chamber reserved for the static positioning of the target material, but it is greater than the maximum diameter of the statically positioned target material.

Second, through the scatter generating cylinder which provides an infinite number of angles to collide with the incoming high energy electrons, changing the direction of travel of these electrons from a single (uni-directional electron beam) into an infinite number of directions (Omni-directional electron beam).

In another embodiment, the present invention includes a cylindrical metallic structure, which has a galvanized wire grid jacket inside followed by a core unit to place the samples to be treated. The jacket is filled with a stainless steel mesh providing an infinite number of angles for electrons to scatter in every direction. The core is covered on both sides by attenuators, which decreases the dose of energy into the chamber from the direct electron beam and facilitate the scatter. Metallic rods are placed inside the chamber to hold the materials to be irradiated in place. The present invention demonstrates that the electron scatter delivers a relatively even dose over the entire irradiated surface, including hidden spots and depressions.

In some embodiments, the outside cylinder wall of the chamber can be made of any material to keep the scatter generating material cylindrical. Typically, when the scatter generating mesh, grid or any other scatter producing structural arrangement is firm enough to stand on its own, the outside cylinder shell is not necessary. The diameter of the scatter chamber (outside diameter) is sometimes limited by the validated scan width of the two 10 MeV Linear Accelerators. In some embodiments with a maximum of 24 inches for a chamber to be used on this particular embodiment typically cannot be of a greater radius than 12 inches, if it can be centered for every pass, or lesser diameter to ensure that the chamber is scanned fully during each pass.

The scatter generating structure (e.g., mesh, grid, lattice structure, or any individually designed structure that provides the greatest number of angles to the direct beam with the minimum number of obstacles to the scattered electrons traveling inward towards the target material etc.,) can be made of any material with high Z value, or a material yet undiscovered, that yields the highest rate of scatter possible from the direct high energy unidirectional electron beam. A skilled artisan would have the liberty to use any materials to generate the greatest electron scatter in the chamber in order to have Omni-directional lower and lower energy scattered electrons from the direct uni-directional high energy electrons from the two 10 MeV Linear Accelerators.

It is to be understood that every time the electrons collide, the electrons loose kinetic energy and have less and less penetration power. However, even the second, third and perhaps $4^{th}$ collisions leave enough energy in the electrons to contribute to the surface dose accumulation.

In some embodiments, the present inventors can estimate attenuation requirement on the top and the bottom of the scatter space hosting the target mass, to yield the final target dose after the last pass through the dual beam (e.g., about 1.7 to about 2.6 kGy for carcasses with *E. coli* or about 25.0 to about 27.5 kGy for surgical implants, using the same procedure with different attenuation and different number of passes through the beams.) obtained from the direct unidirectional high energy electron beam. Typically, this is achieved through running the chamber through the beam with a dose mapping sample at least once to obtain the target dose at all points of the target mass, adjusting the attenuation and the speed (which is the timed exposure of the chamber to the direct uni-directional high energy electron beams) until the target dose accumulation (e.g., about 1.7 to about 2.6 kGy or about 25.0 to about 27.5 kGy, or any targeted dose level) is achieved at an acceptable dose uniformity (maximum/minimum) ratio.

In some embodiments, the cylindrical chamber scatters electrons inward for efficient dose accumulation, with the same rationale as the oncology application where many individual beams of low dose are not powerful enough to damage tissue further away from a tumor, but as they get closer and closer to a point of intersection at the center of a tumor, they are adding up at an increasing rate to a dose level that kills cancer cells.

Table 1 demonstrated data acquired from demonstrations of the present inventions. Two sets of objects were used. The phantoms are the dosimetry standards, accumulating the total dose coming directly from the scanning horns of the 10 MeV accelerators for the entire duration of exposure time, outside the scatter system, placed in front of and after the scatter chamber. The average dose was 22 kGy. In the chamber, a carcass, which has an irregular shape was used as the target object. The numbers under the sample column denotes different locations on the same carcass. As the table demonstrated, uniform dose distribution was obtained with an average dose 3.2 kGy. Table 2 shows additional demonstrations of the present invention.

TABLE 1

FIRST CARCASS RUN

| Sample | Location | Dose | Average Dose | Range | Recovery |
|---|---|---|---|---|---|
| 4-1P4 | Phantom | 22.3 | 22 KGY | 4.31-1.99 = 2.3 KGY | 3.2/22 = 14.6% Recovery |
| 4-2P4 | Phantom | 22.1 | | | |
| 5-1P5 | Phantom | 21.9 | | | |
| 5-2P5 | Phantom | 21.7 | | | |
| 1 | Carcass | 2.0 | 3.2 KGY | | |

TABLE 1-continued

FIRST CARCASS RUN

| Sample | Location | Dose | Average Dose | Range | Recovery |
|---|---|---|---|---|---|
| 2 | Carcass | 2.6 | | | |
| 3 | Carcass | 4.3 | | | |
| 4 | Carcass | 2.7 | | | |
| 5 | Carcass | 3.9 | | | |
| 6 | Carcass | 3.6 | | | |
| 7 | Carcass | 3.7 | | | |
| 8 | Carcass | 3.8 | | | |
| 9 | Carcass | 2.7 | | | |
| 10 | Carcass | 2.8 | | | |
| 11 | Carcass | 3.2 | | | |
| 12 | Carcass | 3 | | | |
| 13 | Carcass | 3.4 | | | |

TABLE 2

SCATTER CHAMBER

| Trial | Sample | Location | Rate | Dose | Average Dose | Range | Recovery |
|---|---|---|---|---|---|---|---|
| 1 | 1P26 | Phantom | 4 × 40 FPM | 15.5 | 15.6 KGY | 0.72-4.5 = 3.7 KGY | 2/15.6 = 13% Recovery |
| 1 | 2P26 | Phantom | | 15.6 | | | |
| 1 | 3P26 | Phantom | | 15.8 | | | |
| 1 | 4P26 | Phantom | | 15.6 | | | |
| 1 | 1 | Statue | | 1.2 | 2 KGY | | |
| 1 | 2 | Statue | | 1.3 | | | |
| 1 | 3 | Statue | | 1.6 | | | |
| 1 | 4 | Statue | | 4 | | | |
| 1 | 5 | Statue | | 0.7 | | | |
| 1 | 6 | Statue | | 2.2 | | | |
| 1 | 7 | Statue | | 2.5 | | | |
| 1 | 8 | Statue | | 1.4 | | | |
| 1 | 9 | Statue | | 1.4 | | | |
| 1 | 10 | Statue | | 0.7* | | | |
| 1 | 11 | Statue | | 0.11* | | | |
| 1 | 12 | Statue | | 1.1 | | | |
| 1 | 13 | Statue | | 1.6 | | | |
| 1 | 14 | Statue | | 1.8 | | | |
| 1 | 15 | Statue | | 4.5 | | | |
| 1 | 16 | Statue | | 1.6 | | | |
| 1 | 17 | Statue | | 2 | | | |
| 1 | 18 | Statue | | 2.1 | | | |
| 1 | 19 | Statue | | 1.7 | | | |
| 1 | 20 | Statue | | 2.5 | | | |
| 2 | 1P26 | Phantom | 8 × 60 FPM | 22.1 | 21.2 KGY | 0.8-4 = 3.2 KGY | 2/21.2 = 10% Recovery |
| 2 | 2P26 | Phantom | | 22 | | | |
| 2 | 3P26 | Phantom | | 21.2 | | | |
| 2 | 4P26 | Phantom | | 22 | | | |
| 2 | 1 | Statue | | 1.1 | 2 KGY | | |
| 2 | 2 | Statue | | 1.2 | | | |
| 2 | 3 | Statue | | 1.5 | | | |
| 2 | 4 | Statue | | Broken | | | |
| 2 | 5 | Statue | | 0.8 | | | |
| 2 | 6 | Statue | | 2.6 | | | |
| 2 | 7 | Statue | | 3 | | | |
| 2 | 8 | Statue | | 3 | | | |
| 2 | 9 | Statue | | 1.3 | | | |
| 2 | 10 | Statue | | 3 | | | |
| 2 | 11 | Statue | | 0.2* | | | |
| 2 | 12 | Statue | | 0.9 | | | |
| 2 | 13 | Statue | | 2 | | | |
| 2 | 14 | Statue | | 1.8 | | | |
| 2 | 15 | Statue | | 4 | | | |
| 2 | 16 | Statue | | 1 | | | |
| 2 | 17 | Statue | | 2 | | | |
| 2 | 18 | Statue | | 1.9 | | | |
| 2 | 19 | Statue | | 1.6 | | | |
| 2 | 20 | Statue | | 2.4 | | | |
| 2 | 21 | Top of Chamber | | 1.6 | | | |
| 2 | 22 | Top of Chamber | | 1.7 | | | |

TABLE 2-continued

SCATTER CHAMBER

| Trial | Sample | Location | Rate | Dose | Average Dose | Range | Recovery |
|---|---|---|---|---|---|---|---|
| 2 | 23 | Top of Chamber | | 1.9 | | | |
| 2 | 24 | Top of Chamber | | 1.9 | | | |
| TOTAL | | | | | | 3.5 KGY | 11.5% Recovery |

Table 3 is yet another demonstration of the present invention. In this demonstration, the top of the shroud was over attenuated and did not receive a sufficient dose. Attenuation was modified to address this issue. In addition, the dosimeter was placed directly on the surface of the statue. The statue was a concrete cast of St. Francis of Assisi, chosen for its intricate geometry for this study. As a result, holes were then drilled for all dosimeters to obtain better surface dose measurements. This data point was considered an outlier and not included in the dose average.

TABLE 3

STATUE WITH STAINLESS STEEL MESH SHROUD

| Sample | Location | Dose | Average Dose | Range | Recovery |
|---|---|---|---|---|---|
| 10 | Top | <.7 KGY* | | | |
| 11 | Bottom | 6.42 | 6.4 KGY | 3.2-.7 = 2.5 KGY | 1.6/6.4 = 25% Recovery |
| 1 | Statue | 2.1 | 1.6 KGY | | |
| 2 | Statue | 1.1 | | | |
| 3 | Statue | 1.8 | | | |
| 4 | Statue | 7.4** | | | |
| 5-1 | Statue | 0.7 | | | |
| 5-2 | Statue | 0.8 | | | |
| 5-3 | Statue | 0.9 | | | |
| 6 | Statue | 3.2 | | | |
| 7 | Statue | 2.9 | | | |
| 8 | Statue | 1.4 | | | |
| 9 | Statue | 1.4 | | | |

It is noted that the present invention can be made of any materials, sizes and shapes for the hollow chamber or the mesh. In addition, different energy level, direct linear high energy electron accelerators (e.g., 5 MeV OR 7.5 MeV LINACS) can also be used. In some embodiments, the present invention can have the chamber inverted for repeated passes, as long as the target mass is inverted as well, without changing its position in the scatter chamber. Furthermore, the energy attenuator can be made of any materials, sizes, shapes, numbers and positions. Again, the desired level of dose accumulation, the scatter generating components (material and design) and time needed to achieve the desired level of pasteurization and/or sterilization on the surface of a target mass can be varied, depending on the nature of the needed application and/or target material.

As used herein, dose uniformity is not the same as dose uniformity of depth/dose applications. In the present invention, the minimum dose is typically the one that is sufficient to securely achieve the minimum desired kill rate on the most intricate point of the surface of that specific target mass. The maximum desired kill rate is typically defined by the resiliency of the target material. In this application there is no definitive calculus associated with the dose uniformity (maximum/minimum) relationship, as it is typically and necessarily found in depth/dose applications.

Figure 2:
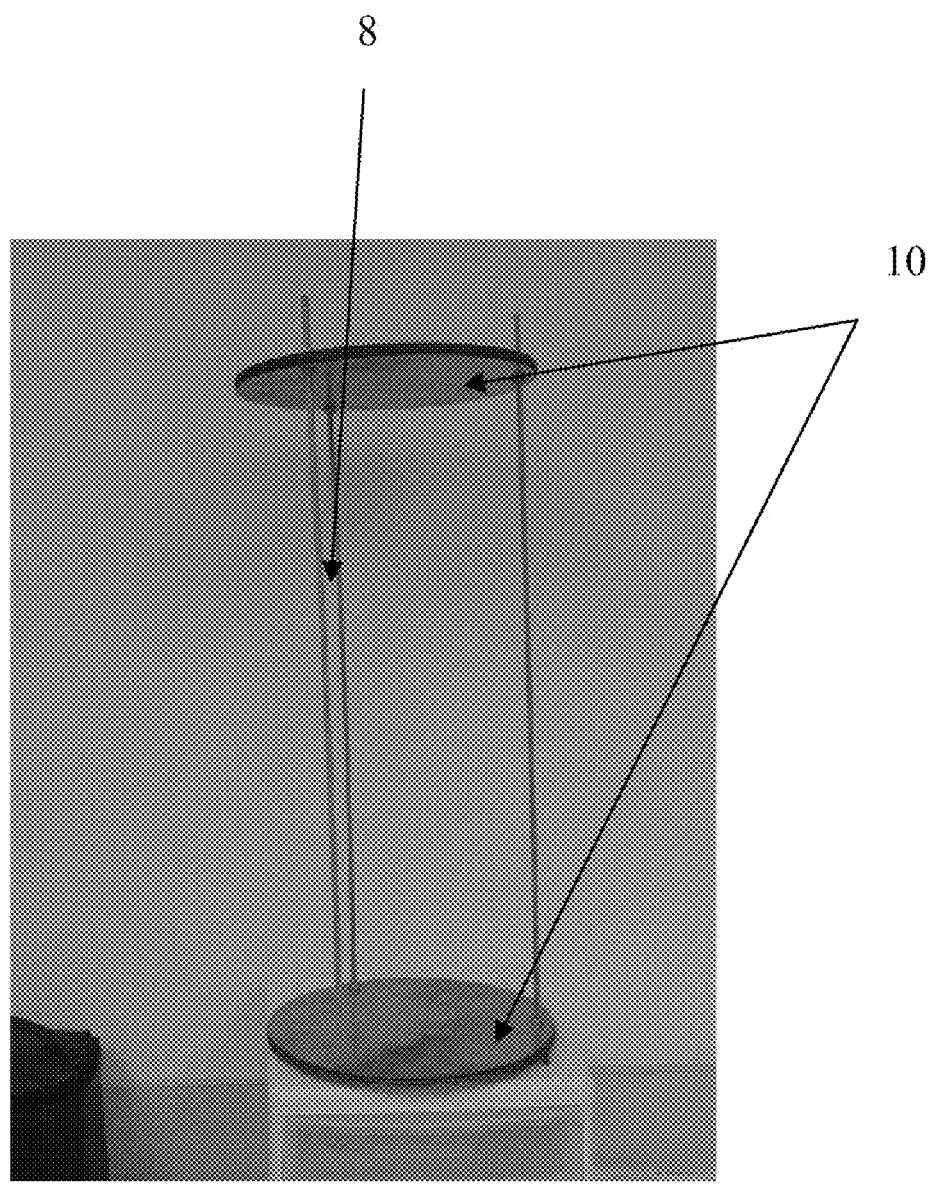
FIG. 2 is a photograph of some internal components of the present invention.
Figure 3:
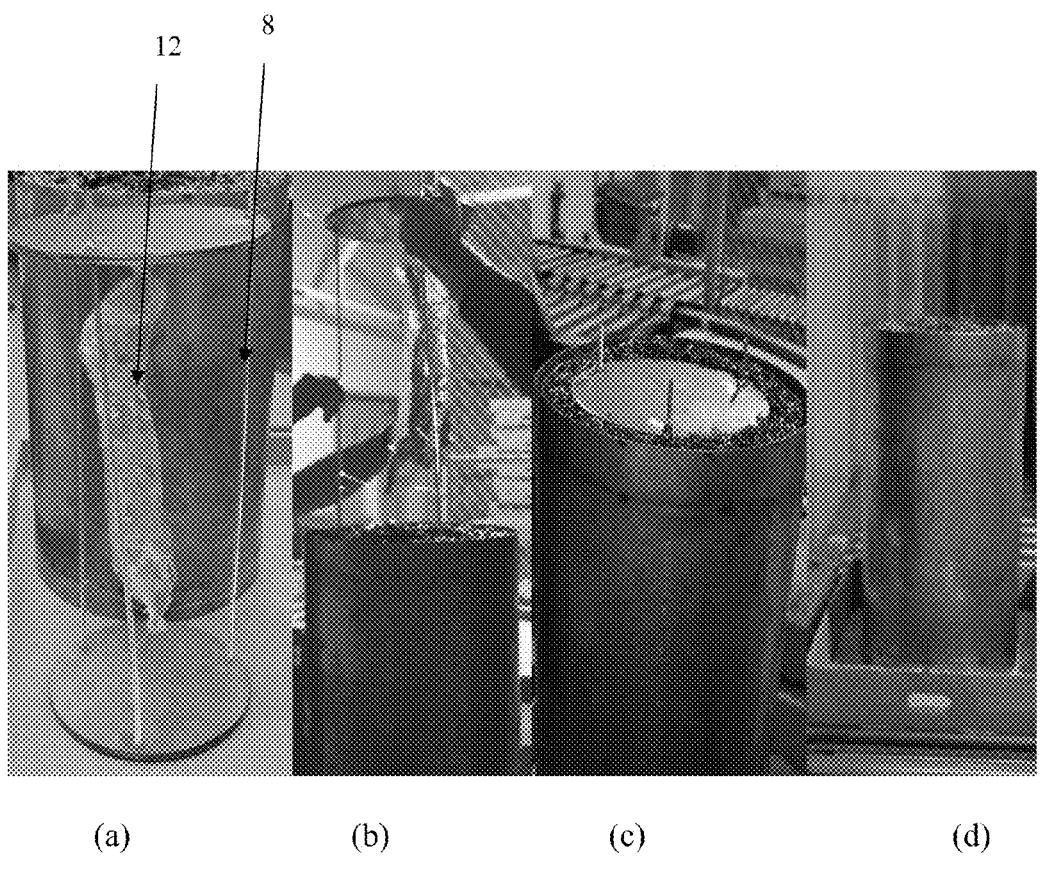
FIGS. 3(a) to 3(d) are photographs of positioning an object inside the present invention.

FIG. 1 is a photograph of the electron scatter chamber #2. The chamber includes a cylindrical metallic structure #4 with a wire grid jacket #6 inside followed by a core unit to place the samples to be treated. The jacket #6 is filled with a stainless steel mesh providing an infinite number of angles for electrons to scatter in every direction. FIG. 2 is a target holder #8 and is covered on both sides by attenuators #10, which decreases the dose delivered into the chamber from the direct electron beam. FIG. 3(*a*) is a photograph of a target holder #8 with a rabbit carcass #12. FIG. 3(*b*) is a photograph showing the physical placement of the target holder #8 into the electron scatter chamber #2. FIGS. 3(*c*) and 3(*d*) are two photographs of the target holder #8 and the attenuators #10 inside the electron scatter chamber #2.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A target sterilization system comprising:
a chamber having a inner scattering space;
a mesh positioned in the scattering space;
at least one energy accelerator directed into the scattering space operable to be scalable in electrical power to generate one or more linear electron beams; wherein one or more of the linear electron beams strike the mesh and scatter in random linear directions to produce one or more omni-directional energy beams and an electron cloud in the scattering space with sufficient energy levels for dose accumulation on the target surface to achieve at least substantial sterilization.

2. The system of claim 1, further comprises a direct high energy electron beam attenuator positioned in the path of the direct high energy electron beams exiting the linear high energy electron accelerator scanning horns, above and/or below the scattering space, to cause a reduction in dose delivered by one or more of the direct high energy linear electron beams.

3. The system of claim 2, wherein the energy attenuator comprises at least one attenuator plate positioned within the chamber, wherein the attenuator plate comprise a diameter less than diameter of the chamber.

4. The system of claim 1, wherein the mesh comprises a stainless steel mesh, a galvanized wire grid or a stainless steel scrubbing pad to provide an infinite number of angles for one or more of the uni-directional, high energy linear electron beams to be scattered omni-directionally.

5. The system of claim 1, wherein one or more of the uni-directional, high energy linear beam comprises one or two 10 MeV high energy linear electron accelerators.

6. The system of claim 1, wherein the mesh is disposed along interior surface of the chamber.

7. The system of claim 1, further comprises a target holder to secure at least one of the target within the chamber.

8. The system of claim 1, wherein the target comprises round, spherical, cylindrical, uneven or irregular surfaces.

9. A method to pasteurize/sterilize at least one target comprising:
placing at least one target in a chamber having a scattering space;
generating one or more linear energy beams using at least one electron accelerator;
directing one or more of the linear electron beam to contact a mesh positioned in the scattering space; and
scattering one or more of the linear electron beam in random linear directions to generate an energy cloud for sufficient time to engulf the target surface with sufficient dose accumulation as the function of exposure time to achieve at least substantial sterilization.

10. The method of claim 9, further comprises attenuating one or more of the linear electron beam using at least one attenuator at each end of the scatter chamber.

11. The method of claim 9, wherein one or more of the linear electron beam is attenuated by the attenuators to a dose level not to exceed the final target dose.

12. The method of claim 10, wherein the scattering of one or more of the linear electron beam is continuous while the chamber is under/above the scanning horns.

13. The method of claim 10, wherein the linear electron beam comprises one or two 10 MeV, linear accelerators.

14. The method of claim 10, wherein the mesh comprises a stainless steel mesh, a galvanized wire grid or a stainless steel scrubbing pad disposed along the internal of the chamber.

15. The method of claim 10, wherein the energy cloud comprise sufficient accumulated dose to penetrate up to about one centimeter of the target mass.

16. The method of claim 10, wherein the target comprises round, spherical, cylindrical, uneven or irregular surfaces.

17. An apparatus comprising:
a chamber having a inner scattering space;
a mesh positioned in the scattering space;
at least one 10 MeV linear accelerator directed into the scattering space operable to be scalable in electrical power to generate one or more linear electron beams; wherein one or more of the linear electron beams strike the mesh and scatter in random linear directions to produce one or more omni-directional energy beams and an electron cloud in the scattering space with sufficient energy levels for dose accumulation on the target surface to achieve at least substantial sterilization.

18. The apparatus of claim 17, further comprises a direct high energy electron beam attenuator positioned in the path of the direct high energy electron beams exiting the linear high energy electron accelerator scanning horns, above and/or below the scattering space, to cause a reduction in dose delivered by one or more of the direct high energy linear electron beams.

19. The apparatus of claim 18, wherein the energy attenuator comprises at least one attenuator plate positioned within the chamber, wherein the attenuator plate comprise a diameter less than diameter of the chamber.

* * * * *